United States Patent Office 3,200,056
Patented Aug. 10, 1965

3,200,056
STABILIZED POLYETHYLENE
Herbert M. Bond, Maplewood, and Jun Tomita, St. Paul, Minn., assignors to Minnesota Mining and Manufacturing Company, St. Paul, Minn., a corporation of Delaware
No Drawing. Filed Feb. 13, 1959, Ser. No. 792,980
16 Claims. (Cl. 204—154)

This application is a continuation-in-part of our applications, Serial No. 566,331, filed February 20, 1956, and Serial Nos. 572,821, 572,822 and 572,823, filed March 21, 1956, all now abandoned.

The present invention relates to a new composition of matter, having a new field of usage, and being especially useful in the electrical insulation field.

Polyethylene has heretofore been used as an electrical insulation material, and has many desirable properties, such as low loss factors with high frequency current, good dielectric strength, etc. However, it has had a number of serious drawbacks or limitations. One of the more serious limitations is the fact that ordinary polyethylene will melt at relatively low temperatures, even at such temperatures as are sometimes encountered in strong sunlight. Relatively moderate temperatures of the order of 90 to 125° C. will melt such material. A material with such low softening and melting point has no practical utility as an insulation in many kinds of machinery.

Attempts have been made to improve the heat resistance of polyethylene, to make it usable as an insulation under circumstances where ordinary polyethylene would soften or melt. One such attempt is described in an article entitled "How Irradiation Affects Long Chain Polymers," by Charlesby, appearing in "Nucleonics," June 1954 issue, pages 18–25. As that article indicates, a polyethylene film may be given an irradiation treatment, as a result of which its resistance to flow at elevated temperatures is greatly increased. However, polyethylene film so treated, upon exposure to elevated temperatures, for example at exposure to temperatures of the order of 135° C. for a week or so, becomes severely degraded, very low in mechanical strength and retains very little resistance to repeated flexing. As a consequence, such irradiation of polyethylene films, while interesting, has not solved the problem of an essentially polyethylene insulation to be exposed to sustained temperatures of the order of those indicated, e.g., 130 to 180° C. or even higher.

An electrical insulating material having the major advantages of a polyethylene insulation, which at the same time avoids the major disadvantages above indicated, is one of the major objects of this invention.

We will now proceed to describe, in the form of several specific examples, how we have succeeded in making such a composition of matter.

*Example 1*

|  | Parts by weight |
|---|---|
| Polyethylene | 100 |
| Antioxidant ("Akroflex C") | 0.15 |
| Chlorinated resin ("Aroclor 5460") | 5 |
| Antimony trioxide ($Sb_2O_3$) | 5 |
| Carbon black ("Carbolac #2") | 0.4 |

The polyethylene raw material (DYNH brand of Union Carbide and Carbon Corp.) melted and flowed at about 110° C. The antioxidant was an aromatic amine, specifically a mixture of 35% diphenyl p-phenylene diamine and 65% phenyl α naphthylamine. "Aroclor 5460" is a chlorinated resin, i.e., a chlorinated polyphenyl resin. "Aroclor 5460" is further identified as a yellow transparent resin which apparently contains about 60% chlorine by weight. It is insoluble in water, glycerine and in the lower molecular weight alcohols. It has a softening point (ASTM E-28) of about 100–105.5° C., and a dielectric constant at 1000 cycles and 25° C. of about 2.5. The carbon black was a channel black having a low pH of about 3.0, a low structural index of about 18, and a high surface area on the order of 95.5 acres per pound. Such properties for carbon blacks are discussed in an article entitled "The Carbon Spectrum for the Rubber Compounder," by Sweitzer and Goodrich in "The Rubber Age," August 1944, page 469.

The polyethylene was first worked or banded on a rubber mill until it was plastic under the heat (about 135° C.) of milling. Then the remaining ingredients were added to the mill, in small increments in the order listed, with continued milling until a uniform plastic blend was obtained. The milling procedure took a total of about 10 minutes using one kilogram of polyethylene.

The plastic blend was then calendered into a strip of film 7 mils thick and given a 20-megarep dose of high energy ionizing irradiation using a resonant transformer-type X-ray apparatus, with its tungsten target removed, as the source for irradiation. If desired, other suitable sources may be used instead. For example, essentially identical results have been obtained using Co-60 (gamma radiation) as the source for high energy ionizing irradiation.

Thereafter, as a test of results obtained, the irradiated strip was heated to 150° C. and maintained at that temperature for seven days, at the end of which period the strip was found to be in good mechanical condition, being tough, flexible and possessing excellent tensile strength and elasticity at room as well as elevated temperatures. It could be repeatedly flexed without rupture or breaking. For example, one such strip was flexed 10,000 times using a Massachusetts Institute of Technology flexing device operated at the rate of 180 flexing cycles per minute (a flexing cycle being a complete bend to about 135° in one direction followed by about a 135° bend in the other direction). At the end of this flexing test, the sample was still in good condition. This treated polyethylene composition retained its initially high dielectric strength and volume resistivity even after extended heating as aforedescribed. On the other hand prior art unstabilized polyethylene films, such as those of the Charlesby article aforementioned, degrade under such sustained high temperature conditions (e.g. 150° C.) into putty-like or brittle masses, which rupture or break almost immediately if flexing or stretching is attempted.

*Example 2*

Example 1 was duplicated except that 10 parts of butyl rubber (copolymer of isobutylene and about 2% isoprene) were blended with the polyethylene as it was worked or banded on the rubber mill. Results comparable to those in Example 1 were obtained. After 100,000 flexures on the MIT flexing device, flexing was terminated.

*Example 3*

Example 2 was duplicated except that 10 parts of a rubbery butadiene-styrene copolymer were used instead of the butyl rubber. The rubbery butadiene-styrene copolymer was a copolymer formed from about 76.5% butadiene and about 23.5% styrene. Results similar to those set forth in Example 1 were obtained. After 750,000 flexures on the MIT tester, flexing was terminated. The exact flex resistance of Examples 1 to 3 is not known; but it is known that they withstand tremendously lengthy flexing.

*Example 4*

Example 1 was duplicated except that the butyl rubber employed in Example 2 was added and the chlorinated resin of Example 1 was replaced by 5 parts by weight of "Hypalon S2." "Hypalon S2" is a chloro-sulfonated aliphatic elastomer, i.e., chloro-sulfonated polyethylene elastomer. It is formed by reacting polyethylene with chlorine and sulfur dioxide and contains about 29% by weight chlorine (equivalent to about one chlorine atom for every six carbon atoms) and about 1.2% sulfur by weight in the form of sulfonyl chloride groups attached to carbon atoms in the polethylene chain. There is about one sulfonyl chloride group for every 100 carbon atoms in the chain.

Results similar to those set forth for Example 1 were obtained. The material withstood about 10,000–15,000 flexures in the flexing test described.

*Example 5*

Example 1 was duplicated except that 10 parts of the butyl rubber of Example 2 were used and 5 parts of zinc oxide instead of antimony trioxide were employed. While zinc oxide exhibits significant effectiveness as one of the stabilizing additives in this combination of ingredients, it is not preferred over antimony trioxide, since combinations otherwise the same but containing antimony trioxide instead of zinc oxide have shown greater stabilization against heat degradation. The product of this example withstood about 75 flexures in the flexing test aforedescribed.

*Example 6*

| | Parts by Weight |
|---|---|
| Polyethylene of Example 1 | 100 |
| Butadiene-styrene copolymer of Example 3 | 10 |
| Antioxidant of Example 1 | 0.15 |
| Carbon black of Example 1 | 0.4 |

In the formula of this example, it is preferable to employ unsaturated synthetic elastic copolymers formed of at least a major proportion of diolefin unsaturated monomers and a minor significant proportion of styrene monomers, which copolymers are frequently referred to as "GR–S" polymers. The amount of synthetic elastic copolymer employed may vary considerably, amounts up to about 25% by weight of the composition being usable with desirable results, but for most purposes, particularly where none of the inherently desired properties of polyethylene are to be reduced to any significant extent, lesser amounts, e.g., between 5 and 20% by weight of the copolymers are used.

The butadiene-styrene copolymer was first worked or banded on a rubber mill until it became plastic under the heat (about 135° C.) of milling. Thereafter, the remaining ingredients were added to the mill, in small increments in the order listed, with continued milling until a uniform plastic blend was obtained. The milling procedure took a total of about 10 minutes using one kilogram of polyethylene.

The plastic band was then calendered into a strip of film 7 mils thick and given a 20-megarep dose of high energy ionizing irradiation using a resonant transformer X-ray apparatus, with its tungsten target removed, as the source for irradiation.

The results obtained were substantially the same as those set forth for the product of Example 1. After 25,000 flexures, testing of this film was terminated.

*Example 7*

Example 6 was duplicated except that the antioxidant was replaced by 0.15 part by weight of "Agerite White." "Agerite White" is an aromatic amine antioxidant, specifically di-β-naphthyl-p-phenylene diamine. In the flexing test, this film withstood about 25,000 flexures without breaking.

A particularly interesting property of the new modified polyethylene of this invention is that with respect to its resistance to degradation at elevated temperatures, e.g., 100° C., while in contact with copper wire or other copper surfaces. Copper does not promote degradation of our composition. On the other hand, ordinary polyethylene, subjected to irradiation as described by Charlesby in the above-identified article, undergoes serious degradation when heated to temperatures of the order of 100° C. in contact with copper.

Irradiated film products of our invention can be wound on a motor coil, heated to bond into a continuous coating, and tested by running the motor under high temperature and humidity. Polyethylene of the Charlesby type soon cracks or shatters in this test procedure, whereas material of our invention remains firmly in place and continues to provide effective insulation.

The dose of high energy ionizing irradiation given our composition may vary greatly, for example, from a very small amount, e.g., about 2 megareps, up to about 40 megareps, but is preferably maintained between about 3.5 to 20 megareps. (A megarep is one million reps, the latter being a modified Roentgen unit, i.e., a Roentgen equivalent physical. One rep of ionization of a tissue is defined as the equivalent of the energy loss in the absorption of one Roentgen of gamma radiation by air.) Irradiation at low dosage levels is used to prepare products hereof which are suitably non-melting and retain their strength properties after exposure to elevated temperatures, but which desirably may be fused together at such elevated temperatures or those only slightly higher.

The term "high energy ionizing irradiation" inherently excludes such insignificant irradiation as may be received on the earth's surface through the atmosphere from the sun. An operative energy level may be from about 100,000 to about 20 million electron volts. Thus, "high energy ionizing irradiation" may be characterized as irradiation having an energy level from about 100,000 to 20 million electron volts.

While we do not wish to be limited by theory, based upon such investigations as we have been able to make to date in respect to theory, we are of the view that when our mixtures of ingredients, such as indicated in the above examples, are subjected to irradiation treatment as taught herein, the tendency of the polyethylene to oxidize is inhibited, possibly due to some physical or chemical stabilizing action. It is entirely possible that the irradiation treatment, when applied to our compositions, produces chemical interactions beyond that of cross-linking of the polyethylene: see the article by Charlesby, above mentioned. This is illustrated by the following anaysis. Films were prepared of a composition containing 100 parts by weight of polyethylene, 10 parts of chlorinated aromatic resin, 2 parts of antimony oxide, and a fraction of a part of amine antioxidant. One film was then irradiated with 30 megareps. Separate samples of radiated and non-irradiated film were each cut into small pieces and each separately extracted with a large volume of heptane at room temperature for 96 hours, i.e. to constant weight. About 9.4% of the weight of the non-irradiated film was removed in such extraction, whereas only about 6.9% of the weight of the irradiated film could be extracted.

Whatever the theory, we get an effect and result wholly different from, and completely original and novel over anything known heretofore, insofar as we are aware. Our modified polyethylene composition, for the first time, provides a new material, composed primarily of polyethylene, and usually from about 70 to 95% by weight of polyethylene, preferably 80–95% polyethylene, and having its major advantages, while avoiding its disadvantages so as to make it available in the insulation field and other fields where it is subjected to relatively high temperatures for long periods of time and must maintain toughness and flexibility to be practical and serviceable. Heat-exposed films (e.g. 150° C. for one week) which withstand at least 50 flexures in the aforementioned test exhibit desirable properties for some uses in the electrical field, although products withstanding over a thousand up to several hundred thousand or more flexures are by far the most preferred, and have greater versatility of use without failure. One can readily visualize in view of the teachings herein that entirely new electrical insulation uses are now possible with polyethylene.

Small percentages of rubbery polymers, e.g., 10% more or less, up to approximately 20% by weight of the composition, contribute to the processing properties of our compositions and to the improved stabilization effected in combination with other ingredients and with high energy ionizing irradiation as aforeillustrated. Up to about 10% antimony trioxide in combination with other ingredients, particularly an organic chlorinated material in amounts up to about 10% by weight, as particularly illustrated in Example 1, gives a preferred type of product of outstanding stabilization. Where amine-type antioxidants are employed, as is preferred, they may be employed between about 0.1 to 1.0% by weight of the composition; and where carbon black is employed, amounts on the order of 0.2% to 5% by weight of the composition are useful. It will also be understood that a multitude of various fillers, colored or other pigments, fibers, metal powder, waxes, plasticizers and/or other ingredients or compounding agents may be added if desired for their normal or intended purposes.

Our compositions may be marketed or used in any form or shape as desired, with or without other structural components, e.g., as films, pellets, tubes, fibers, heat sealing strips, hot melt coatings, slot liners, oriented retractable fibers or films, molded insulators, sheet articles of stabilized polyethylene on cloth or mats, hermetic sealers, as a backing element for a new and improved stretchable or relatively non-stretchable pressure-sensitive adhesive tape, cable or wire insulation, etc. In the last named case, we prefer to extrude a non-irradiated mixture around the cable or wire and thereafter irradiate the article so formed. However, we may wrap wires and other objects with irradiated films of our invention and then heat the wrapped article to form a continuous coating or covering.

Very important among the uses for our compositions are those in the field of high temperature electrical insulation, particularly copper insulation, where our compositions exhibit new and unexpected properties.

While we have described our invention and illustrated it by way of several specific examples, we likewise contemplate variants or equivalents of those compositions disclosed, which are novel over the prior art and/or are covered by the appended claims.

That which is claimed is:

1. A polyethylene product electrically non-conductive and useful as electrical insulation, comprising polyethylene blended with a combination of ingredients for inhibiting the thermal degradation of said polyethylene, said product being non-flowing at 150° C. and highly resistant to degradation at elevated temperatures, retaining toughness, elasticity, and tensile strength even after being subjected to 150° C. for one week, and said product being formed by blending at least 70% by weight of polyethylene with up to 30% by weight of a combination of ingredients for inhibiting the thermal degradation of polyethylene and subjecting the blend to between approximately 2 and 40 megareps of high energy ionizing irradiation having an energy level between about 100,000 and 20 million electron volts, said combination of ingredients for inhibiting the thermal degradation of polyethylene including an organic chlorinated material, up to 10% by weight of antimony trioxide, an amine-type antioxidant, and carbon black.

2. The product of claim 1 formed from a blend containing from about 80 to 95% polyethylene.

3. A film of the product of claim 2, said film being further characterized in that, after exposure to a sustained temperature of 150° C. for one week, it still can be repeatedly flexed without breaking.

4. A polyethylene product electrically nonconductive and useful as electrical insulation, comprising polyethylene blended with a combination of ingredients for inhibiting the thermal degradation of polyethylene, said product being non-flowing at 150° C. and retaining toughness, elasticity, and tensile strength even after being subjected to 150° C. for one week, said product being formed by blending at least 70% by weight of polyethylene with up to 30% by weight of said combination of ingredients for inhibiting the thermal degradation of polyethylene and subjecting the blend to between approximately 2 and 40 megareps of high energy ionizing irradiation having an energy level of from about 100,000 to 20 million electron volts, said combination of ingredients for inhibiting the thermal degradation of polyethylene including up to 20% by weight of an organic rubbery elastomer, between 0.1 and 1.0% by weight of amine-type antioxidant and between 0.2 and 5% by weight of carbon black.

5. The product of claim 4 formed from a blend containing from about 80 to 95% polyethylene.

6. A film of the product of claim 5, said film being further characterized in that, after exposure to a sustained temperature of 150° C. for one week, it still can be repeatedly flexed without breaking.

7. A film of the product in claim 1, said film being further characterized in that, after exposure to a sustained temperature of 150° C. for one week, it still can be repeatedly flexed without breaking.

8. The product of claim 1 wherein the organic chlorinated material is a chlorinated polyphenyl.

9. The product of claim 1 wherein the organic chlorinated material is a chloro-sulfonated polyethylene elastomer.

10. A polyethylene product electrically non-conductive and useful as electrical insulation, comprising polyethylene blended with a combination of ingredients for inhibiting the thermal degradation of said polyethylene, said product being non-flowing at 150° C. and highly resistant to degradation at elevated temperatures, retaining toughness, elasticity, and tensile strength even after being subjected to 150° C. for one week, and said product being formed by blending at least 70% by weight of polyethylene with up to 30% by weight of a combination of ingredients for inhibiting the thermal degradation of polyethylene and subjecting the blend to between approximately 2 and 40 megareps of high energy ionizing irradiation having an energy level between about 100,000 and 20 million electron volts, said combination of ingredients for inhibiting the thermal degradation of polyethylene including an organic chlorinated material, zinc oxide, an amine-type antioxidant, and a low pH, high surface area and high structural index carbon black.

11. The polyethylene product of claim 4 wherein the combination of ingredients for inhibiting the thermal degradation of polyethylene includes up to 20% butyl rubber.

12. A film of the product of claim 4, said film being further characterized in that, after exposure to a sustained temperature of 150° C. for one week, it still can be repeatedly flexed without breaking.

13. A polyethylene product electrically nonconductive and useful as electrical insulation, comprising polyethylene blended with a combination of ingredients for inhibiting the thermal degradation of said polyethylene, said product being non-flowing at 150° C. and highly resistant to degradation at elevated temperatures, retaining toughness, elasticity, and tensile strength even after being subjected to 150° C. for one week, and said product being formed by blending at least 70% by weight of polyethylene with up to 30% by weight of a combination of ingredients for inhibiting the thermal degradation of polyethylene and subjecting the blend to between approximately 2 and 40 megareps of high energy ionizing irradiation having an energy level between about 100,000 and 20 million electron volts, said combination of ingredients for inhibiting the thermal degradation of polyethylene including, by weight, between 0.1 and 1.0% of an amine antioxidant, between 0.2 and 5% of a carbon black, and up to 25% of a butadiene-styrene copolymer.

14. A film of the product of claim 13, said film being further characterized in that, after exposure to a sustained temperature of 150° C. for one week, it still can be repeatedly flexed without breaking.

15. The polyethylene product of claim 13 formed from a blend containing from about 80 to 95% polyethylene.

16. A polyethylene product electrically nonconductive and useful as electrical insulation, comprising polyethylene blended with a combination of ingredients for inhibiting the thermal degradation of said polyethylene, said product being non-flowing at 150° C. and retaining toughness, elasticity, and tensile strength even after being subjected to 150° C. for one week, said product being formed by (1) blending at least 70% by weight of polyethylene with up to 30% by weight of a combination of ingredients including up to 10% chlorinated organic material, up to 10% antimony trioxide, between about 0.1 and 1.0% amine-type antioxidant and between about 0.2 and 5% carbon black, and then (2) subjecting the blend to between approximately 2 and 40 megareps of high energy ionizing irradiation having an energy level between about 100,000 and 20 million electron volts.

References Cited by the Examiner

UNITED STATES PATENTS

| 2,480,298 | 8/49 | Happoldt | 204—162 |
| 2,727,879 | 12/55 | Vincent et al. | 260—45.9 |
| 2,981,668 | 4/61 | Brasch | 204—154 |
| 2,989,451 | 6/61 | Prochaska | 204—162.1 |

FOREIGN PATENTS 742,933  1/56  Great Britain.

OTHER REFERENCES

Lawton: Nature (July 11, 1953), vol. 172.
Symposium on "Utilization of Radiation From Fission Products," June 1953.
Modern Plastics, volume 31 (April 1954).
Chemical and Engineering News, April 11, 1955.
Chemical and Engineering News, vol. 33, November 21, 1955.
"Irrathene," G. E. Technical Report, 14 pages, April 27, 1954.

WINSTON A. DOUGLAS, *Primary Examiner*.

JOHN R. SPECK, JOSEPH REBOLD, *Examiners*.